350-276 SR
1/24/78    OR    4,070,100

United States Patent [19]
Akiyoshi

[11] 4,070,100
[45] Jan. 24, 1978

[54] FILTER FOR PARTIALLY TRANSMITTING LIGHT

[76] Inventor: Katsuyuki Akiyoshi, 821, Oaza-Shimotobaru, Taihei, Chikujo, Fukuoka, Japan

[21] Appl. No.: 719,865

[22] Filed: Sept. 1, 1976

[51] Int. Cl.² .............................. G02B 27/00
[52] U.S. Cl. .................... 350/276 R; 350/164; 350/286
[58] Field of Search ............ 350/276 R, 276 SL, 314, 350/315, 164, 266, 268, 286, 97–105, 109, 112; 313/474; 301/37; 358/238

[56] References Cited

U.S. PATENT DOCUMENTS

| | | | |
|---|---|---|---|
| 2,381,614 | 8/1945 | Möller et al. | 358/238 |
| 2,773,411 | 12/1956 | Schwede | 350/276 SL |
| 3,393,034 | 7/1968 | Imai | 350/276 R |
| 3,590,773 | 7/1971 | Ruppert | 350/112 |
| 3,623,797 | 11/1971 | Daw | 350/286 |
| 3,636,915 | 1/1972 | Ruppert | 350/112 |
| 3,704,934 | 12/1972 | Holmes et al. | 350/164 |
| 3,758,197 | 9/1973 | Klang et al. | 350/286 |

*Primary Examiner*—Paul A. Sacher
*Assistant Examiner*—B. W. delos Reyes
*Attorney, Agent, or Firm*—Frank J. Jordan

[57] ABSTRACT

A filter comprises a plurality of quadrilateral filter units arranged one after another, each of which is made of two right-angled prisms whereby the incoming light is partially transmitted or shielded by the prisms.

15 Claims, 8 Drawing Figures

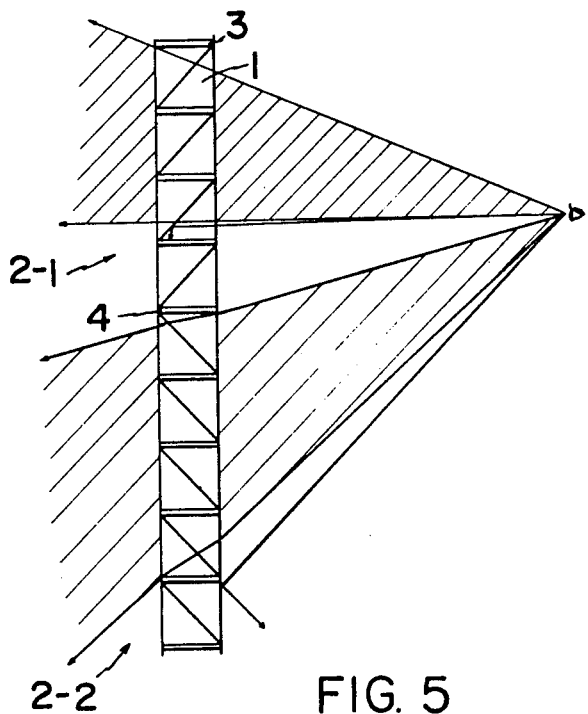
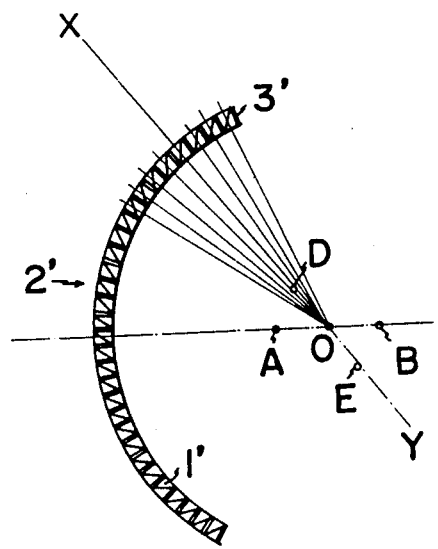

FILTER FOR PARTIALLY TRANSMITTING LIGHT

BACKGROUND OF THE INVENTION

This invention relates to a filter made of prisms and which partially transmits or shields light.

Conventional transparent glass plates transmit light through the entire surface thereof. Therefore, when it is employed as a front window or a windshield of a car, the driver is often dazzled by the light of an oncoming car. Furthermore, when it is employed as a plate glass front of a display case which faces the sun-shining outside street, the sun beams are transmitted through the window and fade the articles on display resulting in the deterioration of the commercial value of the articles.

It is an object of the present invention to provide a prism-made filter which can resolve the aforementioned problems which have afflicted conventional glass elements.

It is further an object of the present invention to provide a filter which is applicable to other specific uses.

This invention relates to a filter which is characteried in that two right-angled prisms have their inclined surfaces thereof abutting with each other thus forming quadrilateral filter units and those filter units are stacked and secured one after another forming an elongated filter plate and furthermore a shield means is provided between the stacked surfaces of the filter units whereby the thus produced filter can partially transmit or shield the incoming light.

BRIEF DESCRIPTION OF DRAWINGS

FIG. 4 is a side view of a modified filter of this invention wherein two groups of filter units which have their inclined surfaces disposed in an opposite direction to each other are connected.

FIG. 5 is a side view of another modification of the filter unit wherein a filter has a concave or an arcuate configuration.

DETAILED DESCRIPTION OF THE INVENTION

The filter of this invention is described in detail in conjunction with the attached drawings.

Figure 1:
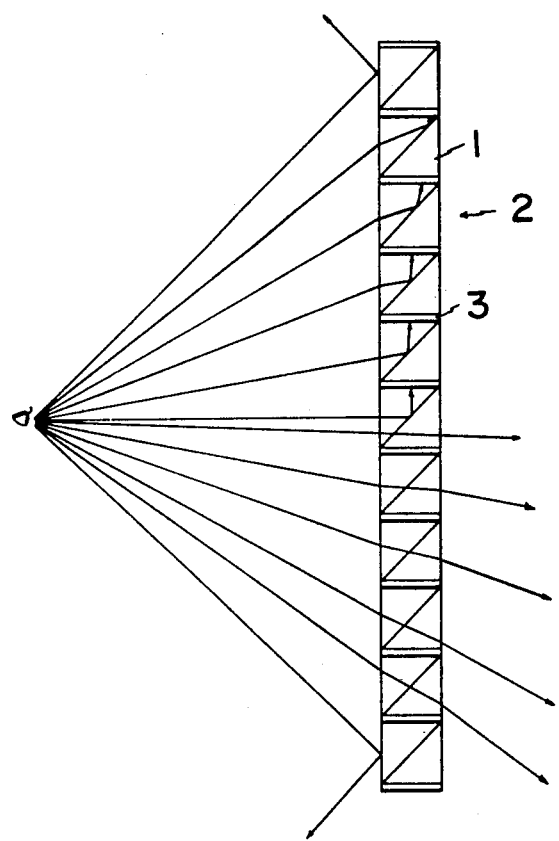
FIG. 1 is a side view of a filter of this invention wherein the basic structure of the filter is shown.

In FIG. 1, the principle construction of the filter of this invention is described wherein parts of right-angled prisms 1 have their inclined surfaces abutting with each other forming a filter unit 2 such that the incident light which has an angle of incidence of more than a critical angle is all reflected by the inclined abutting faces of the units 2. To obtain the desired reflection of the incoming light by the inclined surface, a thin air layer must be formed between the inclined surfaces of the prisms 1. Or a past which has very weak reflection rate may be provided between the inclined surfaces.

These units 2 are stacked and secured with each other forming an elongated flat plate while a shield plate 3 which prevents the direct light from transmitting from one unit 2 to the next unit 2 is provided between each two units 2.

Since each filter unit 2 is constructed such that two right-angled prisms 1 have their inclined surfaces arranged in a right-upward direction as shown in FIG. 1, a group of filter units 2 which are disposed above the eye level reflect all the incident lines of vision from the eye, and shield plate 3 disposed between each two units 2 blocks all the above reflected lines of vision, while another group of filter units 2 which are disposed below the eye level allow the line of vision from the eye to pass therethrough such that outer object can be seen.

Corresponding to the vertical position of the eye level relative to the filter, the range that the line of vision can pass through the filter or the range that outer objects can be seen is also raised or lowered.

Figure 2:
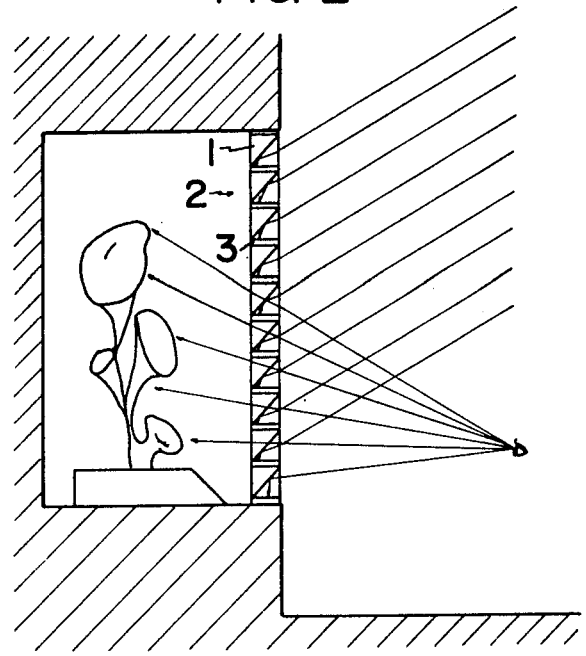
FIG. 2 is an explanatory view showing the filter of this invention applied to a glass front of a display case.

FIG. 2 shows a prism-made glass front of a display case to which the filter of FIG. 1 is applied wherein the downwardly directed incident light beams such as sun beams are all reflected by the inclined faces of the filter units 2 and subsequently blocked by the shield plates 3 while a pedestrian on the street sees articles on display in an upward direction so that his line of vision can pass through the filter units 2; namely, he can clearly see the inner articles on display.

If the above filters are applied to window panes of an office or an ordinary housing, the direct rays of sun into the room can be shielded while the portion of the window pane which is below the eye level allow the lines of vision from the viewer to pass therethrough so that the window is provided with unique characteristics quite different from those of conventional window panes.

Furthermore since a pedestrian who may walk outside the building can see the ceiling of the room through the window but cannot see the objects in the room below his eye level, the secrecy or the privacy of the room can be guaranteed. This effect is further improved when the pedestrian tries to raise his eye level to look into the room since the portion of the window which prevents him from seeing the inside of the room is enlarged corresponding to the rise of his eye level.

If the above-mentioned filter is disposed up-side-down, only sun beams can pass through the window pane while the inner objects can be partially shielded.

Figure 3A:
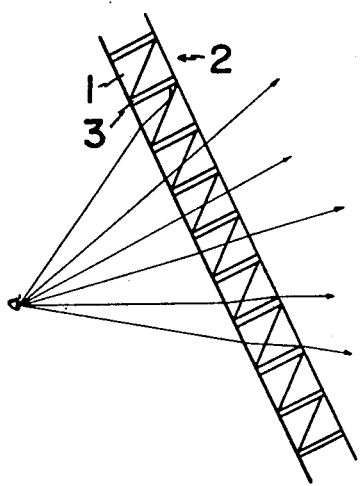
FIG. 3A and FIG. 3B are explanatory views showing the filter in different inclined positions relative to the position of eye.
Figure 3B:
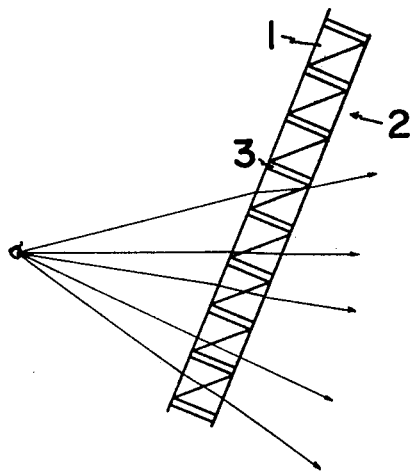

In FIG. 3A and FIG. 3B, the filter is inclined to either direction from an imaginary vertical line while the location of the eye is unchanged.

Due to the above inclination of the filter, the field of vision can be varied. From a practical point of view, the filter may be inclined gradually corresponding to the location and the altitude of the sun so that the above-mentioned advantage of the filter of this invention is assured throughout the daytime.

By arranging spaced-apart shields of the filter perpendicular to the ground, the above-mentioned optical effect can be demonstrated as transverse shielding or transmitting of light through the filter.

In FIG. 4, two groups of filter units are joined at a border line 4 forming a combined filter wherein the inclined abutting surfaces of each filter unit 2-1 of the upper group are arranged in an opposite direction to those of each filter unit 2—2 of the lower group.

Due to the above construction, the characteristics and effects of the combined filter become far more complicated than those obtained by the filter shown in FIG. 1. In FIG. 4 the field of vision is indicated by hatched lines.

The following materials are considered as shield plates 3 which are provided for preventing the direct light from passing from one filter unit to another filter unit:

1. non-transparent bodies which completely block the direct as well as reflected light,
2. colored or non-colored semi-transparent bodies which do not allow the direct light to pass through but diffise the light,
3. diffused reflection bodies such as fluorescent paint which emit and reflect the light at the portion of the filter where direct light cannot transmit through the filter.

When the shield plate 3 is made of a semi-transparent body, indirect light passes through the shield plate at a portion of the filter where direct light can pass through while the direct light can pass through the remaining portion of the filter. Therefore, the filter has the same optical effect as that of a combined window which comprises frosted glass and transparent glass. This filter has an advantage in a room where the intensity of incoming or the direct light such as sun beams are avoided without decreasing the amount of light within the room. Furthermore this filter is also provided with the aforementioned advantage or effect that the border which divides the filter into two portions, namely the portion where direct light can transmit and the portion where direct light can can be varied corresponding to the location of the eye of a viewer.

The case where the shield 3 is the diffused reflection body such as the fluorescent paint is considered below.

When the light is cast onto the above filter, the light passes through or is reflected depending on the angle of incidencce thereof.

If the above filter is employed in front of the head light of a car, the head light illuminates the area in front of the car and below the horiontal level of the head light so that a driver of an oncoming car is not dazzled by the light. Furthermore, the light emitted from the head light of the oncoming car strikes the filter of the approaching car and the light then is reflected from the inclined faces of the each filter unit and illuminates the shield and this illuminated light is then diffusedly reflected by flourescent paint and returns to the eyes of the driver of the oncoming car so that the driver of the oncoming car can assure the presence of the approaching car whereby the filter contributes to the decrease of traffic accidents at night.

Heretofore a filter having a flat-plate construction was disclosed.

FIG. 5 discloses a semi-circular filter. When the eye is located at the center O of the curvature of the filter, all the filter units 2' are positioned perpendicular to the eye so that lines of vision from the eye are all reflected by the inclined faces of the filter units and then are blocked by the shields whereby no objects outside the filte can be seen.

When the eye is disposed closer to the filter to a point A by moving thereof or by moving the filter toward the eye, the upper half of the filter allows the eye to see there. When the eye is moved away from the filter to a point B, the upper half of the filter allows the eye to see through the filter while the lower half of the filter blocks the light of vision from the eye.

When the eye is moved along the X-O-Y line, and the eye is located on a point D which is closer to the filter than the center O, the inclined upper portion of the filter above the X-O-Y line blocks the line of vision and the inclined lower portion of the filter allow the eye to see through the filter. The opposite effect can be obtained when the eye is moved to a point E.

In this way, in view of the concave or circular filter, when the eye is moved slightly away from the center in any direction, the border line which defines the portion of the filter which the eye can see through and the portion thereof which the eye can not see through is greatly moved or charged.

Figure 6:
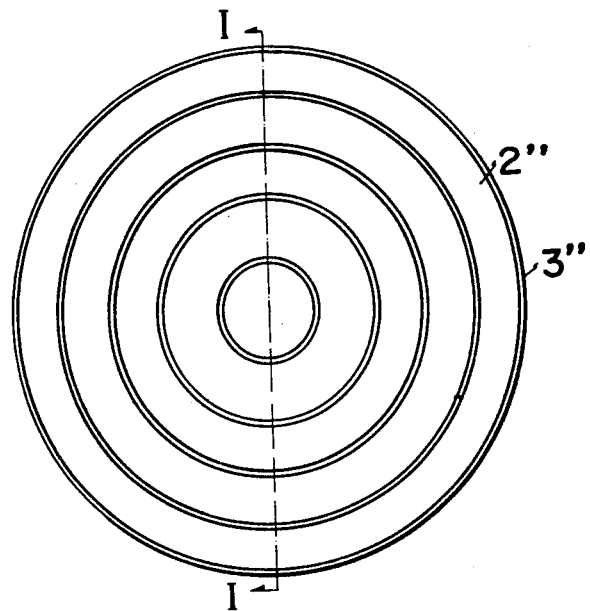
FIG. 6 is a front view of still another modification of the filter wherein the filter has a semi-sperical construction.
Figure 7:
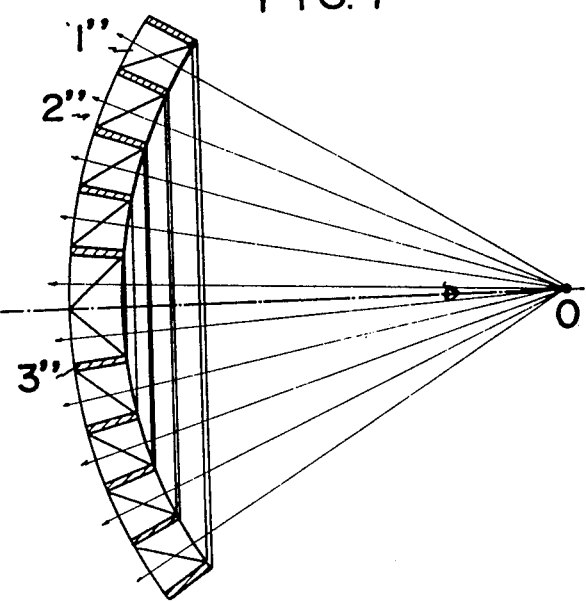
FIG. 7 is a cross sectional view of FIG. 6 taken on line I—I.

FIG. 6 and FIG. 7 show a semi-spherical body comprising a plurality of ring-shaped filters.

When the eye is located at the center of spherical filter, a central circular line which divides each ring-shaped filter unit 2" into outer and inner rings operates as the border line to show the outer ring bright and the inner ring dark and forming a number of concentric circular bright and dark stripes. When the eye is moved a litter close to the filter from the center O, the innermost ring filter unit 2" of the spherical filter becomes dark and the other remaining outer ring filter units 2" substantially allow the eye to see through them.

In this way, only the central portion of the filter blocks the light transmission, namely does not allow the light of vision from the eye to pass through, so that by arranging the sun or a light source in alignment with the above-mentioned dark central portion of the filter, the object which is disposed on the same light axis can be clearly observed with the exception of the portion which is hidden by the above central portion of the filter.

In addition, when the above-mentioned circular ring-shaped filters are constructed in the opposite way as compared to the construction of the filter shown in FIG. 7, the opposite effect is provided wherein the light passes through only the central portion of the inverse spherical filter.

As has been described heretofore, the filter of the present invention is provided with the characteristic that the field of vision or the portion of the filter where the light can pass through can be restricted by the angular or linear displacement of either eye or the light source.

What is claimed is:

1. A filter for partially transmitting light comprising a plurality of quadrilateral filter units arranged and joined one after another to form a continuous filter device, each of said filter units comprising two right-angled triangular prisms, each of said triangular prisms having an inclined face and two perpendicularly disposed side faces, said triangular prisms being mated with each other at their respective inclined faces to form said filter unit with the latter being bounded by said side faces, said filter units being mated with each other at said side faces, and shield means disposed between the mating side faces of said filter units.

2. A filter according to claim 1 wherein said filter device has a thickness substantially equal to the thickness of said joined filter units.

3. A filter according to claim 1 wherein each of said filter units has a first pair of opposed and substantially parallel side faces disposed perendicularly respectively to a second pair of opposed and parallel side faces, one side face of said first pair of opposed side faces intersecting at a first intersection with one side face of second pair of opposed side faces, the other side face of said first pair of opposed side faces intersecting at a second intersection with the other side face of said second pair of opposed side faces; said inclined mating faces of said filter units extending between said first and second intersections.

4. A filter according to claim 1 wherein said one side face of said first pair of opposed side faces intersects with said one side face of said second pair of opposed side faces at a right angle, said other side face of said first pair of opposed side faces intersecting said other side face of said second pair of opposed side faces at a right angle.

5. A filter according to claim 4 wherein said filter device has substantially parallel sides formed by said first pair of opposed side faces.

6. A filter according to claim 5 wherein said filter units are joined at said second pair of opposed side face.

7. A filter according to claim 5 wherein said shield means extend between said parallel sides of the filter device.

8. A filter according to claim 1 wherein said filter units are assembled to form a flat-plate filter device.

9. A filter according to claim 1, wherein said filter units are assembled to form an arucate filter device.

10. A filter according to claim 1, wherein said filter units are ring-shaped units which are concentrically and arcuately assembled to form a spherical filter device.

11. A filter according to claim 1 wherein said shield means is made of non-transparent material.

12. A filter according to claim 1 wherein said shield means is made of semi-transparent material.

13. A filter according to claim 1 wherein said shield means is made of diffused refraction material.

14. A filter according to claim 13 wherein said diffused refraction material is fluorescent paint.

15. A filter according to claim 1 wherein said filte units are assembled to form a concave filter device.

* * * * *